(12) United States Patent
Revinskaya et al.

(10) Patent No.: US 8,719,797 B2
(45) Date of Patent: May 6, 2014

(54) SYSTEM AND METHOD FOR DEBUGGING DYNAMICALLY GENERATED CODE OF AN APPLICATION

(75) Inventors: Hanna Revinskaya, Toronto (CA); Abdul Rahman Sattar, Toronto (CA)

(73) Assignee: BlackBerry Limited, Waterloo, Ontario (CA)

( * ) Notice: Subject to any disclaimer, the term of this patent is extended or adjusted under 35 U.S.C. 154(b) by 569 days.

(21) Appl. No.: 12/782,070

(22) Filed: May 18, 2010

(65) Prior Publication Data

US 2011/0289486 A1   Nov. 24, 2011

(51) Int. Cl.
*G06F 9/44*   (2006.01)
*G06F 11/00*   (2006.01)

(52) U.S. Cl.
USPC .............. 717/129; 717/124; 717/126; 714/35

(58) Field of Classification Search
None
See application file for complete search history.

(56) References Cited

U.S. PATENT DOCUMENTS

| | | | |
|---|---|---|---|
| 5,732,210 A | | 3/1998 | Buzbee |
| 5,815,714 A | | 9/1998 | Shridhar et al. |
| 6,226,787 B1 * | | 5/2001 | Serra et al. ................. 717/129 |
| 6,353,923 B1 | | 3/2002 | Bogle et al. |
| 6,668,369 B1 * | | 12/2003 | Krebs et al. ................ 717/125 |
| 7,299,454 B2 * | | 11/2007 | Pugh et al. ................. 717/124 |
| 7,363,544 B2 | | 4/2008 | Day et al. |
| 7,478,367 B2 * | | 1/2009 | Morgan et al. ............. 717/124 |
| 7,506,313 B2 | | 3/2009 | Bates et al. |
| 7,757,215 B1 * | | 7/2010 | Zhou et al. ................. 717/126 |
| 7,823,133 B2 * | | 10/2010 | Tamagno et al. ............ 714/35 |
| 7,823,135 B2 * | | 10/2010 | Horning et al. ............ 717/126 |
| 7,992,042 B2 * | | 8/2011 | Todoroki et al. ............ 714/35 |
| 8,032,864 B2 * | | 10/2011 | Pugh et al. ................. 717/126 |
| 8,136,097 B2 * | | 3/2012 | Konishi et al. ............. 717/129 |
| 8,224,997 B2 * | | 7/2012 | Strack et al. ............... 717/124 |
| 8,321,840 B2 * | | 11/2012 | Nagarajan et al. .......... 717/126 |
| 8,522,215 B1 * | | 8/2013 | Aldrich et al. ............. 717/126 |
| 8,549,479 B2 * | | 10/2013 | Chavvakula et al. ....... 717/124 |
| 8,549,481 B2 * | | 10/2013 | Birsan et al. ............... 717/125 |
| 8,561,028 B1 * | | 10/2013 | Zuckerman ................. 717/129 |
| 8,572,579 B2 * | | 10/2013 | Ashish et al. .............. 717/129 |
| 8,578,340 B1 * | | 11/2013 | Daudel et al. .............. 717/129 |
| 2001/0005852 A1 | | 6/2001 | Bogle et al. |
| 2003/0037317 A1 * | | 2/2003 | Emberson ................... 717/129 |
| 2003/0192032 A1 * | | 10/2003 | Andrade et al. ............ 717/124 |
| 2003/0221187 A1 * | | 11/2003 | Barsness et al. ............ 717/129 |
| 2004/0003375 A1 * | | 1/2004 | George et al. .............. 717/124 |
| 2004/0025083 A1 * | | 2/2004 | Nanja et al. ................. 714/35 |

(Continued)

OTHER PUBLICATIONS

Nicholas Nethercote and Alan Mycroft; Redux: A Dynamic Dataflow Tracer; Elsevier Science; 2003;retrieved online on Dec. 3, 2013; pp. 1-22; Retrieved from the Internet: <URL: ftp://ftp.cis.upenn.edu/pub/papers/lee/entcs-89-2/89.2.010.pdf>.*

(Continued)

*Primary Examiner* — Thuy Dao
*Assistant Examiner* — Hanh T Bui
(74) *Attorney, Agent, or Firm* — Gowling Lafleur Henderson LLP (57) ABSTRACT

A system and method for debugging dynamically generated application code is provided. The system and method compare a received script chunk of the application to the contents of script tags of a source document, and if the script chunk does not match any of the contents of the script tags, it is identified as dynamically generated code. The identified dynamically generated code may then be stored in a separate file for further display and debugging.

17 Claims, 4 Drawing Sheets

(56) References Cited

U.S. PATENT DOCUMENTS

| | | | |
|---|---|---|---|
| 2004/0040013 A1* | 2/2004 | Kalra | 717/129 |
| 2004/0054990 A1* | 3/2004 | Liao et al. | 717/124 |
| 2004/0194067 A1* | 9/2004 | Lien et al. | 717/129 |
| 2005/0066312 A1* | 3/2005 | Barsness et al. | 717/129 |
| 2005/0177820 A1* | 8/2005 | Mei et al. | 717/129 |
| 2005/0188358 A1* | 8/2005 | Johnson et al. | 717/129 |
| 2005/0198620 A1* | 9/2005 | Mathiske et al. | 717/124 |
| 2005/0210335 A1* | 9/2005 | Muratori et al. | 714/35 |
| 2005/0216894 A1* | 9/2005 | Igarashi | 717/126 |
| 2005/0240820 A1* | 10/2005 | Vannerson et al. | 714/35 |
| 2006/0129993 A1* | 6/2006 | Belisario et al. | 717/124 |
| 2006/0200807 A1* | 9/2006 | Bates et al. | 717/129 |
| 2007/0006158 A1* | 1/2007 | Takuma et al. | 717/129 |
| 2007/0150867 A1* | 6/2007 | Barsness et al. | 717/124 |
| 2007/0168979 A1* | 7/2007 | Kumar et al. | 717/124 |
| 2007/0168995 A1* | 7/2007 | Cohen | 717/129 |
| 2007/0250819 A1* | 10/2007 | Fjeldstad et al. | 717/129 |
| 2007/0266376 A1* | 11/2007 | Yim et al. | 717/129 |
| 2008/0010532 A1* | 1/2008 | Lev et al. | 714/35 |
| 2008/0066055 A1* | 3/2008 | Shebs | 717/124 |
| 2008/0098363 A1* | 4/2008 | Barsness et al. | 717/129 |
| 2008/0209405 A1* | 8/2008 | Roberts et al. | 717/129 |
| 2008/0301648 A1* | 12/2008 | Heidasch | 717/129 |
| 2009/0138857 A1* | 5/2009 | Botzer et al. | 717/129 |
| 2009/0158257 A1* | 6/2009 | Xu et al. | 717/129 |
| 2009/0164981 A1* | 6/2009 | Heidasch et al. | 717/129 |
| 2009/0307663 A1* | 12/2009 | Maybee et al. | 717/124 |
| 2010/0332905 A1* | 12/2010 | Izumi et al. | 714/35 |
| 2011/0289486 A1* | 11/2011 | Revinskaya et al. | 717/129 |
| 2012/0291017 A1* | 11/2012 | Fuhrer et al. | 717/129 |
| 2012/0317548 A1* | 12/2012 | Olsa et al. | 717/129 |
| 2013/0227530 A1* | 8/2013 | Zhang et al. | 717/129 |
| 2013/0263095 A1* | 10/2013 | He et al. | 717/129 |
| 2013/0318504 A1* | 11/2013 | Eker et al. | 717/129 |

OTHER PUBLICATIONS

Andrew McCreight et al; A Certified Framwork for Compiling and Executing Garbage-collected Languages; Sep. 2010; ACM; retrieved online on Dec. 3, 2013; pp. 273-284; Retrieved from the Internet: <URL: http://delivery.acm.org/10.1145/1870000/1863584/p273-mccreight.pdf?>.*

Faffaell Settimi et al.; Supporting Software Evolution through Dynamically Retrieving Traces to UML Artifacts; 2004; IEEE; retrieved online on Dec. 3, 2013; pp. 1-6; Retrieved from the Internet: <URL: http://ieeexplore.ieee.org/stamp/stamp.jsp?tp=&arnumber=1334768>.*

* cited by examiner

Figure 1

```
01. <html>
02. <head>
03. <script language="javascript" type="text/javascript">
04. //add inline javascript
05. function addJavaScript() {
06.     var scriptTag = document.createElement("script");
07.     scriptTag.setAttribute("type", "text/javascript");
08.     scriptTag.innerHTML = "function sayHey() {" +
09.         "\n\t alert('hey hey!');" +
10.         "\n\t var a = 5; var b = 7;" +
11.         "\n\t var c = a*b;" +
12.         "\n\t alert (a + '*' + b +' = ' + c);" +
13.         "\n}";
14.     var htmlBodyElement = document.getElementsByTagName('body')[0];
15.     htmlBodyElement.insertBefore(scriptTag, htmlBodyElement.lastChild);
16. }
17. </script>
18. </head>
19. <body>
20. <img src = "test.gif" onClick = "sayHey()">
21. <img src = "add.gif" onClick = "addJavaScript()">
22. </body>
23. </html>
```

Figure 2A

```
01. function sayHey() {
02.     alert('hey hey!');
03.     var a = 5; var b = 7;
04.     var c = a*b;
05.     alert (a + '*' + b +' = ' + c);
06. }
```

SYSTEM AND METHOD FOR DEBUGGING DYNAMICALLY GENERATED CODE OF AN APPLICATION

TECHNICAL FIELD

The disclosure relates generally to debugging applications and in particular to a system and method for debugging dynamically generated code of an application.

BACKGROUND

Debugging applications typically involves executing the application in a simulated run-time environment. Debugging an application allows a developer to identify errors in the application's code and correct them. Debugging of applications can be done in numerous ways, including for example, in a development environment used to develop the application code or alternatively in a debugging component associated with a web browser.

An application is defined by application code. The application code may differ depending on the type of device, or the runtime environment the application is to be executed in. For example, the application code may be expressed in various programming languages, such as the C family of languages, Java™, or other languages. Alternatively, the application code may be expressed using a mark-up language, such as hypertext mark-up language (HTML) and a script language such as JavaScript.

In addition to the application code the application may also include dynamically generated code, which is generated by the application code during execution of the application. Although current debugging techniques work well for debugging existing application code, they are not effective for use in debugging code that is dynamically generated during execution of the application, and in particular applications defined using JavaScript code.

Therefore there is a need for an improved system and method for debugging applications having dynamically generated code.

BRIEF DESCRIPTION OF THE DRAWINGS

Various embodiments of the system and method for debugging dynamically generated code of an application will be described with reference to the drawings in which.

DETAILED DESCRIPTION

In accordance with an aspect of the present disclosure there is provided a method for debugging dynamically generating code of an application. The method comprises receiving at a debugging component, executing on a computer comprising a processor and memory, a script chunk comprising a portion of code of the application to be executed by a processor; extracting tag content from a script tag of a source document associated with the application; comparing the received script chunk to the extracted tag content to determine if the script chunk is associated with code dynamically generated during execution of the application; and storing the script chunk in a separate document when the script chunk is associated with dynamically generated code.

In accordance with a further aspect of the current application there is provided a system for debugging dynamically generated code of an application. The system comprises a computer-readable memory for storing instructions; and a processor coupled to the computer-readable memory for executing the instructions. When the instructions are executed by the processor they configure the memory and the processor to provide a debugging component comprising a dynamic code identification operable to receive a script chunk comprising code to be executed by the processor; extract tag content from a script tag of a source document associated with the application; compare the script chunk to the extracted tag to determine if the script chunk is associated with code dynamically generated during execution of the application; and store the script chunk in a separate document when the script chunk is associated with dynamically generated code.

In accordance with a still further aspect of the present disclosure there is provided a computer readable media storing instructions or statements for use in the execution in a processor of a method for debugging dynamically generating code of an application. The method comprises receiving at a debugging component, executing on a computer comprising a processor and memory, a script chunk comprising a portion of code of the application to be executed by a processor; extracting tag content from a script tag of a source document associated with the application; comparing the received script chunk to the extracted tag content to determine if the script chunk is associated with code dynamically generated during execution of the application; and storing the script chunk in a separate document when the script chunk is associated with dynamically generated code.

An application is described by application code that is executed within a run time environment. The run time environment may be executing on a mobile hand held device, a personal computer or similar computing devices. The application code may comprise instructions for defining the workflow of the application as well as the graphical user interface (GUI) of the application. The application may comprise a stand alone application that is run on a device or additionally or alternatively it may be run within another application, such as a web browser. In either case, the application is considered to be run within a runtime environment.

The application may be described by application code written by a developer, or developers. The application code may be expressed in various languages. For example, the application code may be expressed in an extensible mark-up language (XML). The XML description may include script embedded within tags. For example, JavaScript code may be embedded within "<SCRIPT>" tags. The application code may be included in one or more source documents. For example, a main source document, or root document, provides the main description of the application code, and may include references to other source documents that are to be included such as additional script files.

During execution of the application code, the XML application code is processed in order to generate a document object model (DOM). The DOM of the application code includes elements of the application code as nodes of a tree structure. The content of a node is the script or mark-up language embedded within the tag associated with the node. For example, the DOM may include a node for each <SCRIPT> tag. The content of the node associated with a <SCRIPT> tag may be for example, the JavaScript embedded within the <SCRIPT> tag of the application code.

The DOM of the application may be modified during execution of the application. For example, nodes may be added or removed, and the contents of the nodes may be modified. For example, nodes associated with the GUI may be added or removed in order to modify the appearance of the application. Additionally or alternatively, the DOM may be modified in order to add a new node associated with a <SCRIPT> tag. For example, a node may be added to the DOM that includes a new JavaScript function. Code or script added to the DOM during execution of the application may be considered to be dynamically generated code.

In a broad sense, debugging an application involves informing the developer of errors that have occurred in the execution of the application. The more information that may be provided to the developer the easier it is to debug the application. It is desirable to allow a developer to set a break point at a particular line in the source document. A break point pauses the execution of the application when execution reaches the particular line of the break point. In order to pause the execution of the application at the appropriate point, it is desirable to be able to map a line number within a source document to a line number within a <SCRIPT> tag. During execution of the application, the execution environment numbers the line numbers of a script from the beginning of the associated <SCRIPT> tag in the source document. In order to allow a developer to set break points with in the source document, the location of the <SCRIPT> tag within the source document is determined. For example, a script chunk, which comprises the contents of a script node of the DOM may be provided to a debugger, or component of the debugger, from the runtime environment, or a simulated runtime environment. The runtime environment associates a unique identifier with the script chunk. The debugger matches the script chunk to the associated <SCRIPT> tag by comparing the script chunk to the contents of the <SCRIPT> tags. Once the script chunk is matched to a <SCRIPT> tag location within the source document, it is possible to map line numbers within the script, identified by the unique identifier, with the appropriate line numbers in the source document. This mapping of line numbers within a script chunk to a corresponding location within the source document allows break points to be easily set within the source document as well as inspecting the lines within a source document that may be causing an error.

The runtime environment may provide the script chunk to the debugger at various times. For example the script chunk may be provided when the associated node is first created. Additionally or alternatively, the script chunk may be provided when code within the script chunk is executed, or about to be executed.

When attempting to debug code that is dynamically generated during the execution of the application, it is not possible to set a break point within the source document since the code being executed is not part of the application code, rather it is only the code responsible for dynamically generating the code.

In order to allow for the debugging of dynamically generated code, the current description describes a debugging component that includes a dynamic code identification component operable to identify script chunks that contain dynamically generated code. Once the script chunk of the dynamically generated code has been identified, it is stored in a separate document. The developer may then set break points within the new separate document. The script is associated with the new document, so that any break points set in the document may correctly pause execution of the application.

Figure 1:
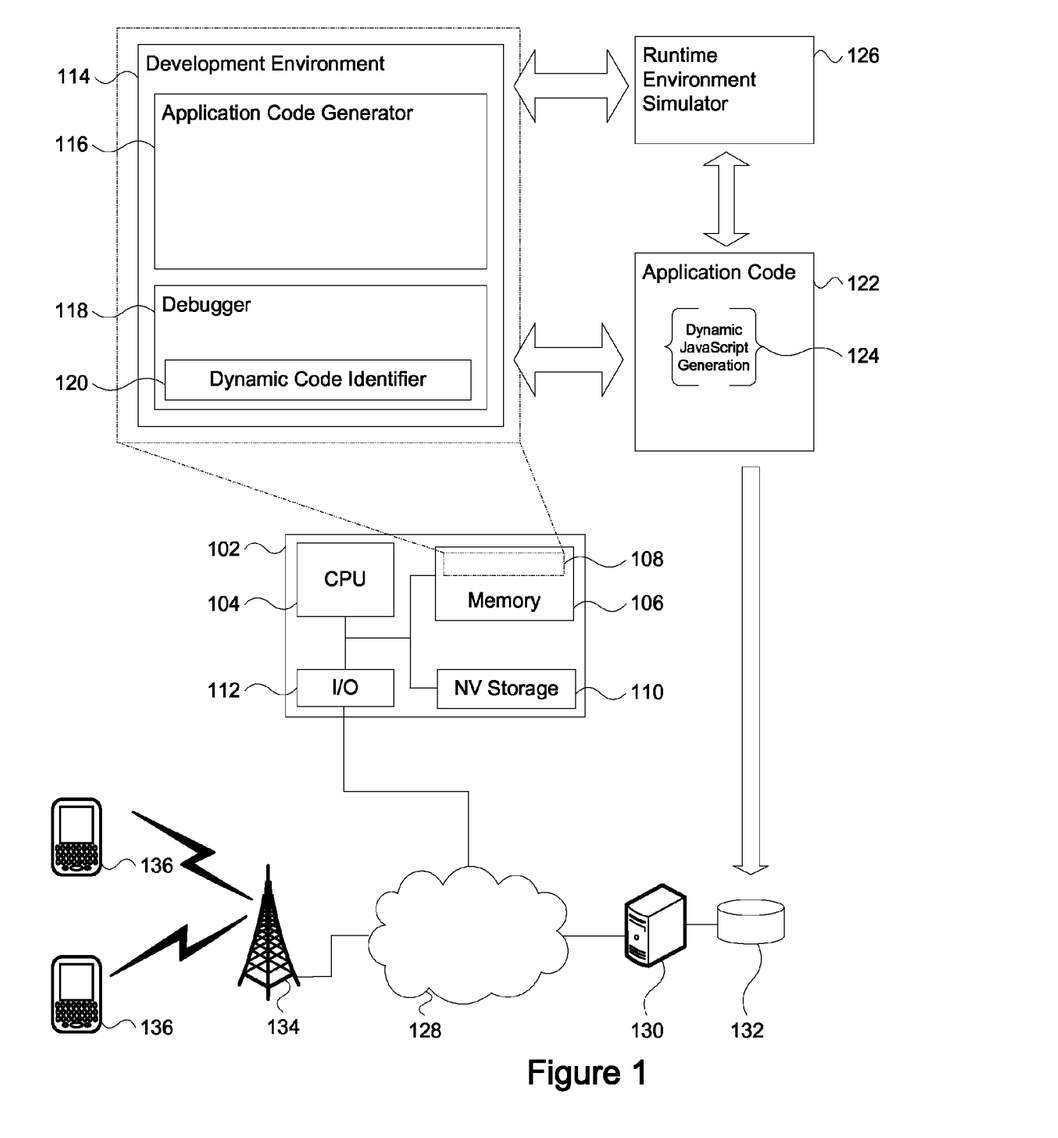
FIG. 1 is a schematic of an environment in which a debugging component may be used, according to an example embodiment.

FIG. 1 is schematic of an environment in which the debugging component may be used. The environment 100 comprises a development computer 102. The development computer 102 may be used by a developer or programmer when creating an application. The development computer 102 comprises a central processing unit (CPU) 104 that is coupled to various other components. These components may include a memory 106 that stores computer-readable instructions 108 for configuring the computer 102. The components may further include a non-volatile storage component 110 for storing information in the computer 102 as well as input-output component 112 that may connect the computer 102 to peripheral components such as network 128 or a keyboard, video, mouse (KVM).

The computer-readable instructions 108 stored in the memory 106 include instructions for providing a development environment 114. The development environment 114 comprises an application code generation component 116 that may be used to create and modify the application code 122. The application code generation component 116 may comprise a simple text editor. Additionally or alternatively, the application code generation component 116 may comprise text editors that provide specific functionality useful for developing applications, including for example formatting of code. The application code generation component 116 may further include wizards or scripts for automatically generating code.

The development environment 114 further comprises a debugging component 118 for providing debugging functionality to the development environment 114. The debugging component 118 includes a dynamic code identification component 120 for identifying dynamically generated code and storing the dynamically generated code in a document in order to allow the dynamically generated code to be debugged. The development environment 114 may co-operate with a run-time simulator 126 in order to execute the generated application code 122 in a simulated runtime environment.

The run-time environment simulator 126 may provide information to the development environment 114 or the debugging component 118 as the application code 122 is being executed. The information may include for example script chunks of the application code. The script chunks may be associated with a unique identifier. The contents of the script chunks may comprise the script included within <SCRIPT> tags. The script chunks may be provided to the debugging component 118 when nodes of the script chunks are created, or additionally or alternatively, they may be provided when the code is executed or about to be executed.

Assuming that the script chunk was not dynamically generated, the debugging component matches the received script chunk with the corresponding <SCRIPT> tag in the source document. Once the script chunk is associated with the corresponding <SCRIPT> tag in the source document, break points set in the source document can be translated to the corresponding portion of the appropriate script chunk. Similarly, errors at a particular line in a script chunk can be associated with the corresponding line in the source document.

The application code being created and/or modified includes code for dynamically generating additional code 124. The code 124 for dynamically generating additional code may comprise code for creating a new node within the application's DOM. The dynamically generated code may be inserted into the DOM as the content of the new node. As described above, the runtime environment or simulator may provide the script chunk to the debugging component when the new script node is created. As described further herein, the debugging component identifies the script chunk as being dynamically generated and stores the script chunk in a separate document that may be viewed by the developer in order to allow the code to be more easily debugged. The debugging of the dynamically generated code may make use of various features provided by common debuggers, including for example by using Variables view in order to view, and possibly change the values of application variables.

Once the application code 122 has been sufficiently developed and debugged, the application may be prepared for distribution. The application code may be stored in an application repository 132. The application repository 132 may be accessed from a server 130 that allows the application to be deployed to a device. The server 130 may be a provisioning server, a web server or other type of server. The server 130 may be coupled to a network 128 such as the internet. The development computer 102 may also be coupled to the network 128 through the input-output component 112 in order to deploy the application to the application repository 132, as well as communicating with the provisioning server 130. Devices 136 may be hand held mobile devices such as a smartphone or other personal device with wireless capabilities. The devices 136 may communicate with the server 130 through the network as well as through a wireless communication means 134.

The devices 136 may include a run time environment that corresponds to the run time environment simulator 126 used during the development and debugging of the application code. The runtime environment simulator 126 may be substantially similar to the runtime environment on the device; however the simulator may have additional functionality useful during the development and debugging of the application. Although the devices 136 are depicted as being hand held devices, it will be appreciated that other types of devices are possible. For example, the run time environment may be a web browser and the devices may comprise any computer capable executing the web browser.

Figure 2A:
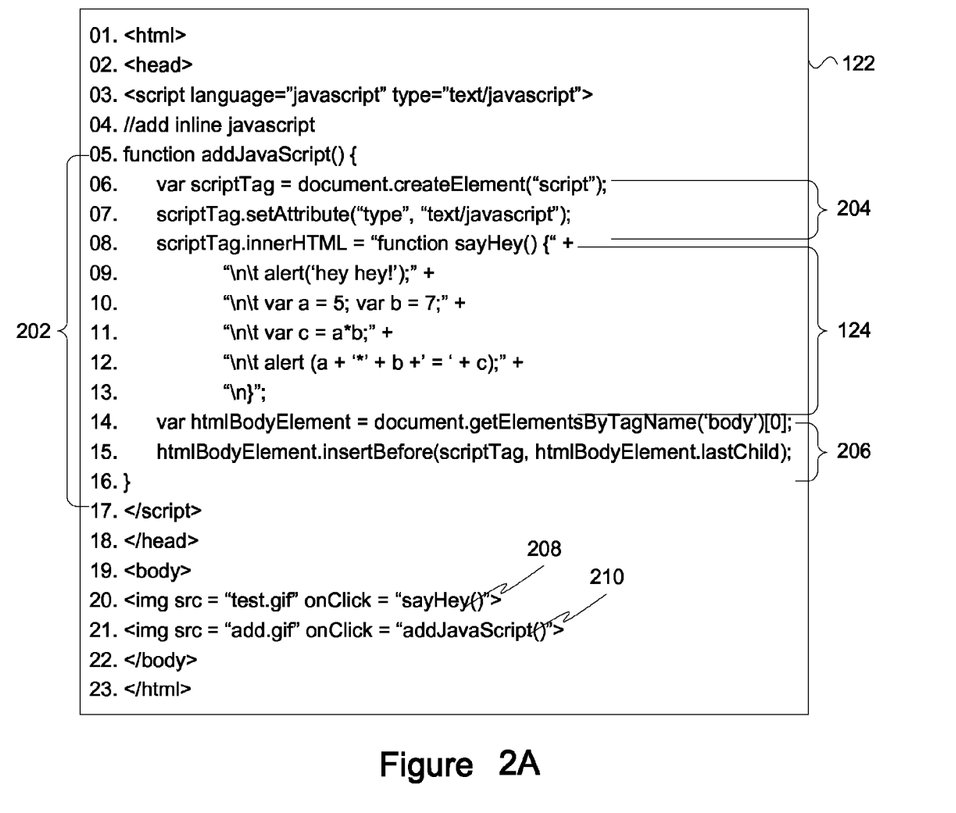
FIG. 2A is a code listing of an example application.

FIG. 2A is a code listing illustrative of a source document, including line numbers of the source document. The source document comprises application code describing the application. The application code comprises both HTML as well as embedded Javascript. The Java script 202 is embedded in the HTML code 122 within a <SCRIPT> tag. The Javascript code 202 included in the source document may be debugged by setting a break point to pause execution of the application at any line in the Javascript code 202. The Javascript code 202 includes a portion 124 for dynamically generating new code.

The dynamic generation Javascript code 202 includes a portion 204 that creates a new script tag node that will be inserted into the DOM of the application 122. The code of the dynamically generated Java script is added to the newly created script tag node by the dynamic code generation portion 124, which adds the dynamic code as a string inserted into the node. Code portion 206 of the Javascript code 202 adds the newly created script tag node to the DOM of the application 122. During execution of the application, the content of the newly created node will be passed from the simulator to the debugging component for processing. The application code 122 includes an image tag 208 that when clicked on attempts to execute the function "Sayhey( )" as well as an image that when clicked on attempts to call the Java script function "addJavaScript( )".

If the test image is clicked the application will attempt to run the "sayhey( )" function. However the "sayhey( )" function is dynamically generated, and as such if the code for generating this function has not been executed by the application the function will not exist and an error will result. In order create the "sayhey( )" the "addJavascript( )" function must first be run by clicking on the add image 210. Once the "addJavascript( )" function is run the "sayhey( )" function is dynamically generated and the test image can be clicked which will run the "sayhey( )" function.

Figure 2B:
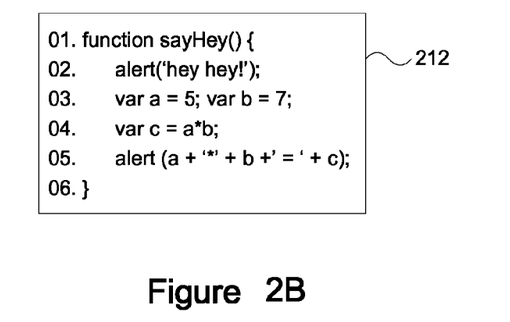
FIG. 2B is a code listing of example dynamically generated application code.

FIG. 2B depicts a code listing the dynamically generated Java script code that results from running the add Java script function of the application 122. The dynamically generated code 212 simply provides an alert as well as simple variable calculations and an alert with the result of the calculations. It should be appreciated that more complex functionality or code may be dynamically generated at run-time. Advantageously through the use of the debugging component described herein the dynamically generated code 212 may be debugged, including setting break points at specific lines of the code.

The debugging component receives a script chunk and tries to match the contents of the received script chunk to the contents of a <SCRIPT> tag in the source document. If the script chunk matches a <SCRIPT> tag, within a given threshold level, the unique identifier of the script chunk is associated with the <SCRIPT> tag in the source document. As a result, it is possible to relate the lines of the script executed by the simulator with the corresponding lines in the source document. So for example, line 3 of the script chunk corresponding to the <SCRIPT> tag in FIG. 2A corresponds to line 06 in the source document. As such, debugging, including setting breakpoints may be performed in the source document.

If the script chunk received by the debugging component does not match the contents of a <SCRIPT> tag of the source document, it is assumed that the script chunk was dynamically generated. Although the contents of the <SCRIPT> tag of the source document and the script chunk may be the same, minor differences may preclude an exact match and as such the contents of the <SCRIPT> tag and the script chunk may considered to match, or not match, using a threshold value. In order to allow the dynamically generated code to be debugged, the dynamic code is stored in a separate document that can be displayed to the developer for debugging. The debugging component maps the script chunk identified by the unique identifier to the separate document storing the dynamically generated code. The debugging component may also map the line numbers for consistency; however since the line numbers of the script chunk will match those of the separate document, it may not be necessary. Regardless, the developer is able to view the newly created separate document that includes the dynamically generated code and debug the code as a normal source document, including setting breakpoints at specific lines in the dynamically generated code.

Figure 3:
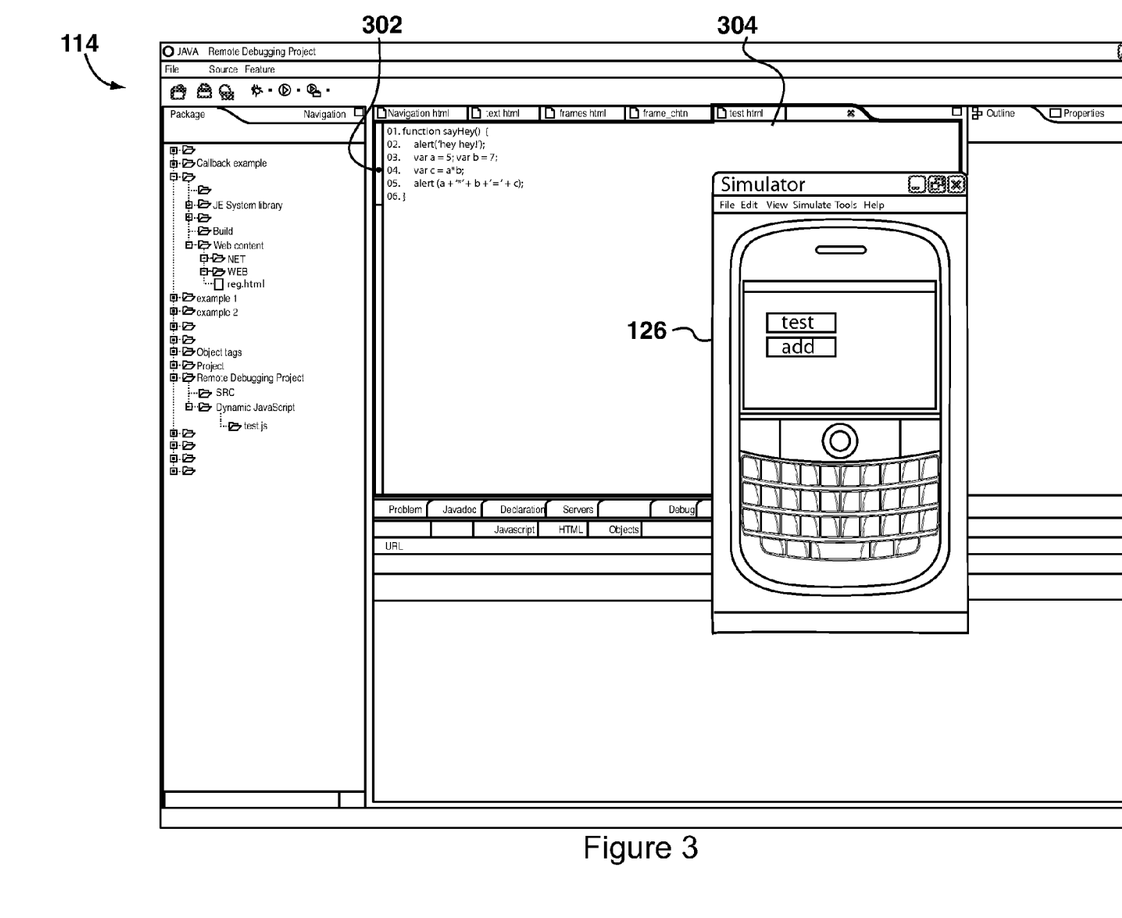
FIG. 3 is a screen shot of an example embodiment development environment.

FIG. 3 depicts in a screen shot an illustrative development environment 114. The development environment 114 may be used for creating, editing and modifying various files associated with an application including source documents comprising application code. The development environment 114 may include a run-time environment simulator 126 which may include a display depicting the device the application is being developed for.

As described further below with reference to FIG. 4, the debugging component creates a new document when a script chunk is identified as being generated by dynamically generated code. The new document may be displayed within the development environment 114 for example as a new tab 304. By creating a new document for the dynamically generated code, a developer is able to use the development environment 114 in order to view and debug the dynamically generated code. For example a break point 302 may be set on a specific line of the dynamically generated code. Other components of the development environment 114 will be familiar to one skilled in the art.

Figure 4:
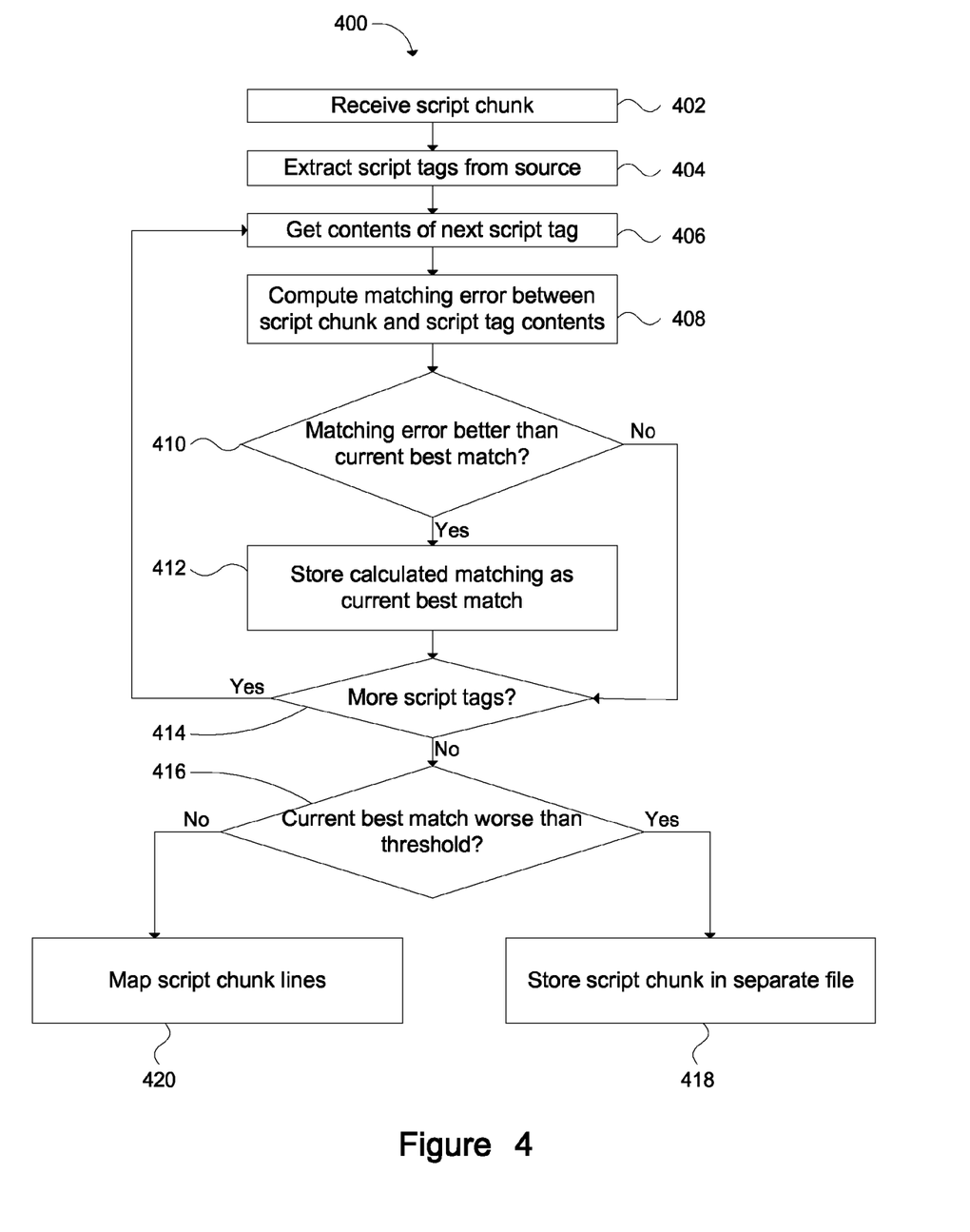
FIG. 4 is a flow-chart of a method for debugging dynamically generated code, according to an example embodiment.

FIG. 4 depicts a flow chart of a method for debugging dynamically generated code. The method 400 may be executed within a debugging component, or more particularly dynamic code identification component of the debugging component executing on a computer. Some of the steps illustrated in the flowchart may be performed in an order other than that which is described. Also, it should be appreciated that not all of the steps described in the flow chart are required to be performed, that additional steps may be added, and that some of the illustrated steps may be substituted with other steps. The method receives a script chunk 402. The script chunk may be received from a run-time environment simulator that is used to execute an application while being debugged. The script chunk may comprise code or script, such as javascript. The script chunk may include code or script that is defined within a <SCRIPT> tag of a source document, or it may include code or script that is dynamically generated during execution of the application. The script chunk may be provided to the debugging component by the simulator. The simulator may associate a unique identifier with the script chunk so that it may be identified.

The debugging component extracts script tags from a source document 404. The source document may define the application code 122. The source document may include multiple script tags embedded within the document. Additionally or alternatively the application code may be defined or described within multiple source documents, one or more of which includes a script tag or multiple script tags. Regardless of if there is one <SCRIPT> tag within a single source document, or if multiple <SCRIPT> tags are embedded within multiple source document, the debugging component retrieves the content of the next script tag 406. It is appreciated that if no <SCRIPT> tag has been processed, the method 400 retrieves the content of the first <SCRIPT> tag. After retrieving the contents of the next <SCRIPT> tag the debugging component computes a matching error between the received script chunk and the content of the <SCRIPT> tag 408. The matching error between the script chunk and <SCRIPT> tag contents may be computed in different ways, for example, it may be computed by using longest common subsequence algorithm in order to determine the longest sequence that is common to both the script chunk and the content of the <SCRIPT> tag.

After computing the matching error between the script chunk and script tag contents the debugging component determines if the matching error is better than a current best match 410. The current best match is used to store the best matching error between the script chunk and the contents of any of the <SCRIPT> tags that have been processed already. If the matching error is better than the current best match, YES at 410, the debugging component updates the current best match in order to store the calculated matching error as the current best match 412. The debugging component may also store the <SCRIPT> tag currently being processed when the calculated matching error is better than the current best match. It will be appreciated that the actual <SCRIPT> tag may not be stored, but rather a reference to it, such as an identifier, or the start and end line numbers of the tag within the source document. This may allow the <SCRIPT> tag that most resembles the script chunk to be associated with a unique identifier associated with the script chunk. It is appreciated that the particulars of how the matching error is calculated will affect how the comparison to the current best match is made. It is understood that while the implementation details of the matching error may vary, a matching error is better if the items being compared are closer in similarity. That is, the best matching error would be between two identical items, while the worst matching error would be between two completely different items.

The debugging component determines whether there are more script tags 414 and if there are, YES at 414, processing returns to get the contents at the next script tag 406 and compute the matching error between the script chunk and the contents of the next script tag. If the matching error between the script chunk and script tag content is not better than the current best match, NO at 410, processing determines if there are more script tags 414.

If there are no more script tags, NO at 414, the debugging component determines if the current best match is worse than a matching threshold value 416.

If the current best match is worse than the matching threshold value, YES at 416, it is assumed that the script chunk is associated with dynamically generated code and the debugging component stores the script chunk in a separate file which may then be debugged as a normal source document. If the current best match is better than, or equal to, the threshold, NO at 416, the script chunk is associated with the <SCRIPT> tag with the best matching error. The line numbers of the script chunk are mapped to the matching lines of the <SCRIPT> tag within the source document.

From the above it will be appreciated that script that is not contained in the source document is considered dynamically generated. A threshold value is used to determine if the script chunk was dynamically generated or not. Although the script chunk should match the content of the <SCRIPT> tag it is associated with, it may not be exactly the same, for example minor differences in formatting may result in a less than perfect matching error. As such the use of a matching threshold allows for these minor differences to be accounted for. A threshold of between 5% and 30% may be appropriate for identifying code that is dynamically generated.

The system and method for debugging dynamically generated code allows dynamically generated code to be identified, stored in a separate file or document, and debugged as other source documents of the application. In order to identify the dynamically generated code, a debugging component receives a script chunk from a run-time simulator and compares the script chunk to the script contained in the source document of the application. If the script chunk is substantially the same as a portion of the script in the source document, then it is assumed that the script chunk is not associated with dynamically generated code. If however the script chunk does not substantially match a portion of the script of a source document of the application it is assumed that the script chunk is associated with code that is dynamically generated. By creating a separate file for the dynamically generated code, break points and other debugging techniques can be applied to the dynamically generated code in order to locate and correct any errors.

Although the above has described the debugging component as being a component of the development environment that cooperates with a run-time environment simulator it will be appreciated that the debugging component that is capable of identifying and debugging dynamically generated code may be part of a browser and the run-time environment simulator may in fact be the run-time environment which in this example would be the browser itself.

The above has described the application being described in the single source document. It will be appreciated that the application may be described in multiple source documents for convenience. Furthermore, although the application has been described as being defined in the mark-up language with embedded script, it will be appreciated that the application may be defined in other ways. It will be appreciated that by comparing a received script chunk to a source document it is possible to identify script chunks that were dynamically generated, and then store them in a separate document for debugging.

Although the above has described various embodiments of a system and method for debugging dynamically generated Java script code, it would be appreciated that the system and method for debugging dynamically generated code may be implemented in various manners not described herein that would be obvious to a person skilled in the art.

What is claimed is:

1. A method for debugging dynamically generated code of an application, the method comprising:
   receiving at a debugging component, executing on a computer comprising a processor and memory, a script chunk comprising a portion of code of the application;
   extracting tag content from a script tag of a source document associated with the application;
   comparing the script chunk to the extracted tag content to determine if the script chunk is associated with code dynamically generated during execution of the application;
   storing the script chunk in a separate document when the script chunk is associated with dynamically generated code,
   setting a breakpoint in the script chunk of the dynamically generated code in the separate document comprising:
      displaying the script chunk stored in the separate document;
      receiving an indication of a line of code in the separate document; and
      setting the breakpoint at the line of code in the separate document for pausing execution of the application when execution reaches the line of code of the dynamically generated code; and
   associating line numbers of the script chunk with line numbers of the source document when the script chunk is not associated with dynamically generated.

2. The method as claimed in claim 1, wherein comparing the script chunk to the extracted tag content comprises:
   determining a matching error between the received script chunk and the tag content extracted from the source document;
   comparing the matching error to a threshold matching error; and
   determining that the script chunk is associated with dynamically generated code when the matching error is higher than the threshold matching error.

3. The method as claimed in claim 1, wherein further comprising:
   setting the breakpoint in the script chunk of the dynamically generated code in the separate document is for pausing execution of the application when execution reaches the breakpoint.

4. The method as claimed in claim 1, further comprising:
   extracting tag content from a plurality of script tags of the source document; and
   comparing the script chunk to tag content extracted from each of the plurality of script tags to determine if the script chunk is associated with dynamically generated code.

5. The method as claimed in claim 4, wherein comparing the script chunk to tag content extracted from each of the plurality of script tags comprises:
   for each tag content extracted from the plurality of script tags:
      determining a matching error between the received script chunk and the tag content;
      determining if the matching error is lower than the current matching error; and
      storing the determined matching error as a current matching error when the determined matching error is lower than the current matching error; and
   determining that the script chunk is associated with dynamically generated code when the current matching error is higher than a threshold matching error.

6. The method as claimed in claim 1, further comprising:
   extracting tag content from a plurality of script tags of a plurality of source documents; and
   comparing the script chunk to tag content extracted from each of the plurality of script tags to determine if the script chunk is associated with dynamically generated code.

7. The method of claim 1, wherein the debugging component is integrated with one of:
   a development environment for developing applications; or
   a web browser; and
   wherein the debugging component receives the script chunk from:
      an execution environment simulator, when the debugging component is a component of the development environment; or
      the web browser when the debugging component is a component of the web browser.

8. The method of claim 1, wherein the script chunk comprises javascript code and the source document includes javascript code within an extensible mark-up language (XML) document.

9. A system for debugging dynamically generated code of an application, the system comprising:
   a computer readable memory for storing instructions; and
   a processor coupled to the computer readable memory for executing the instructions, the instructions, when executed by the processor, configuring the memory and processor to provide:
   a debugging component comprising:
   a dynamic code identification component operable to:
   receive a script chunk comprising a portion of code of the application;
   extract tag content from a script tag of a source document associated with the application;
   compare the script chunk to the extracted tag content to determine if the script chunk is associated with code dynamically generated during execution of the application;
   store the script chunk in a separate document when the script chunk is associated with dynamically generated code,
   set a breakpoint in the script chunk of the dynamically generated code in the separate document by:
      displaying the script chunk stored in the separate document;
      receiving an indication of a line of code in the separate document; and
      setting the breakpoint at the line of code in the separate document for pausing execution of the application when execution reaches the line of code of the dynamically generated code; and associate line numbers of the script chunk with line numbers of the source document when the script chunk is not associated with dynamically generated code.

10. The system as claimed in claim 9, wherein the dynamic code identification component is operable to:
   determine a matching error between the received script chunk and the tag content extracted from the source document;
   compare the matching error to a threshold matching error; and
   determine that the script chunk is associated with dynamically generated code when the matching error is higher than the threshold matching error.

11. The system as claimed in claim 9, wherein the breakpoint is for pausing execution of the application when execution reaches the breakpoint.

12. The system as claimed in claim 9, wherein the dynamic code identification component is operable to:
   extract tag content from a plurality of script tags of the source document; and
   compare the script chunk to tag content extracted from each of the plurality of script tags to determine if the script chunk is associated with dynamically generated code.

13. The system as claimed in claim 12, wherein the dynamic code identification component is operable to:
   for each tag content extracted from the plurality of script tags:
      determine a matching error between the received script chunk and the tag content;
      determine if the matching error is lower than a current matching error; and
      store the determined matching error as the current matching error when the determined matching error is lower than the current matching error; and
   determine that the script chunk is associated with dynamically generated code when the current matching error is higher than a threshold matching error.

14. The system as claimed in claim 9, wherein the dynamic code identification component is operable to:
   extract tag content from a plurality of script tags of a plurality of source documents; and
   compare the script chunk to tag content extracted from each of the plurality of script tags to determine if the script chunk is associated with dynamically generated code.

15. The system of claim 9, wherein the debugging component is integrated with one of:
   a development environment for developing applications; or
   a web browser; and
   wherein the debugging component receives the script chunk from:
      an execution environment simulator, when the debugging component is a component of the development environment; or
      the web browser when the debugging component is a component of the web browser.

16. The system of claim 9, wherein the script chunk comprises javascript code and the source document includes javascript code within an extensible mark-up language (XML) document.

17. A non-transitory computer readable media storing instructions or statements for use in the execution in a processor of a method for debugging dynamically generated code of an application, the method comprising:
   receiving at a debugging component, executing on a computer comprising a processor and memory, a script chunk comprising a portion of code of the application;
   extracting tag content from a script tag of a source document associated with the application;
   comparing the script chunk to the extracted tag content to determine if the script chunk is associated with code dynamically generated during execution of the application;
   storing the script chunk in a separate document when the script chunk is associated with dynamically generated code,
   setting a breakpoint in the script chunk of the dynamically generated code in the separate document comprising:
      displaying the script chunk stored in the separate document;
      receiving an indication of a line of code in the separate document; and
      setting the breakpoint at the line of code in the separate document for pausing execution of the application when execution reaches the line of code of the dynamically generated code; and
   associating line numbers of the script chunk with line numbers of the source document when the script chunk is not associated with dynamically generated code.

* * * * *